United States Patent
Pradas et al.

(10) Patent No.: US 11,888,619 B2
(45) Date of Patent: Jan. 30, 2024

(54) FIRST COMMUNICATION DEVICE, SECOND COMMUNICATION DEVICE AND METHODS PERFORMED THEREIN FOR CONTROLLING TRANSMISSION

(71) Applicant: Telefonaktiebolaget LM Ericsson (publ), Stockholm (SE)

(72) Inventors: Jose Luis Pradas, Stockholm (SE); Torsten Dudda, Wassenberg (DE); Nianshan Shi, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 191 days.

(21) Appl. No.: 17/427,750

(22) PCT Filed: Jan. 30, 2020

(86) PCT No.: PCT/SE2020/050080
§ 371 (c)(1),
(2) Date: Aug. 2, 2021

(87) PCT Pub. No.: WO2020/159427
PCT Pub. Date: Aug. 6, 2020

(65) Prior Publication Data
US 2022/0131646 A1 Apr. 28, 2022

Related U.S. Application Data

(60) Provisional application No. 62/799,773, filed on Feb. 1, 2019.

(51) Int. Cl.
*H04W 4/00* (2018.01)
*H04L 1/08* (2006.01)
*H04W 76/15* (2018.01)

(52) U.S. Cl.
CPC .............. *H04L 1/08* (2013.01); *H04W 76/15* (2018.02)

(58) Field of Classification Search
CPC ................................ H04L 1/08; H04W 76/15
(Continued)

(56) References Cited

U.S. PATENT DOCUMENTS 10,694,569 B2\* 6/2020 Jin ........................... H04L 1/189
10,764,870 B2\* 9/2020 Yi ........................... H04W 72/21
(Continued)

FOREIGN PATENT DOCUMENTS

| EP | 3606274 A1 | 2/2020 |
|----|------------|--------|
| WO | 2018165347 A1 | 9/2018 |
| WO | 2018171546 A1 | 9/2018 |

OTHER PUBLICATIONS

Author Unknown, "Technical Specification Group Radio Access Network; NR; NR and NG-RAN Overall Description; Stage 2 (Release 15)," Technical Specification 38.300, Version 15.2.0, Jun. 2018, 3GPP Organizational Partners, 87 pages.
(Continued)

*Primary Examiner* — Chuong T Ho
(74) *Attorney, Agent, or Firm* — Sage Patent Group

(57) ABSTRACT

Embodiments herein relate to e.g. a method performed by a first communication device for controlling transmission of one or more data packets in a wireless communication network. The first communication device transmits an indication, to a second communication device, indicating one or more of the following: a maximum number of duplicates allowed to be transmitted for each data packet; type of duplication; a data radio bearer, DRB, for which duplication is configured; a radio link control, RLC, entity that is allowed to transmit a duplicate; an order of RLC entities in which the second communication device should transmit a
(Continued)

first data packet and following duplicates; whether duplication is activated or deactivated for a DRB.

14 Claims, 13 Drawing Sheets

(58) Field of Classification Search
USPC .................................................. 370/329, 330
See application file for complete search history.

(56) References Cited

U.S. PATENT DOCUMENTS

| | | | | |
|---|---|---|---|---|
| 10,834,720 B2* | 11/2020 | Tang | .......................... | H04L 1/08 |
| 2018/0279401 A1* | 9/2018 | Hong | ................ | H04W 36/0055 |
| 2018/0368200 A1* | 12/2018 | Jin | ............................ | H04L 1/20 |
| 2019/0104562 A1* | 4/2019 | Tsai | ...................... | H04L 1/1864 |
| 2019/0124551 A1* | 4/2019 | Loehr | ................. | H04W 28/065 |
| 2019/0215685 A1* | 7/2019 | Wang | .................... | H04W 80/08 |
| 2019/0253926 A1* | 8/2019 | Kim | .................. | H04W 28/0278 |
| 2019/0254117 A1* | 8/2019 | Chen | ....................... | H04L 47/34 |
| 2019/0254416 A1* | 8/2019 | McDaniel | ............ | A47B 3/0916 |
| 2021/0204301 A1* | 7/2021 | Lee | ...................... | H04W 72/566 |
| 2021/0211932 A1* | 7/2021 | Lu | .......................... | H04W 80/02 |
| 2021/0345175 A1* | 11/2021 | Shi | ........................ | H04W 28/04 |
| 2021/0345178 A1* | 11/2021 | Shi | ........................ | H04W 28/12 |
| 2022/0264556 A1* | 8/2022 | Babaei | .................. | H04W 76/15 |

OTHER PUBLICATIONS

Nokia, et al., "RP-182090: Revised SID: Study on NR Industrial Internet of Things (IoT)," 3GPP TSG RAN meeting #81, Sep. 10-13, 2018, Gold Coast, Australia, 5 pages.
International Search Report and Written Opinion for International Patent Application No. PCT/SE2020/050080, dated May 7, 2020, 9 pages.

* cited by examiner

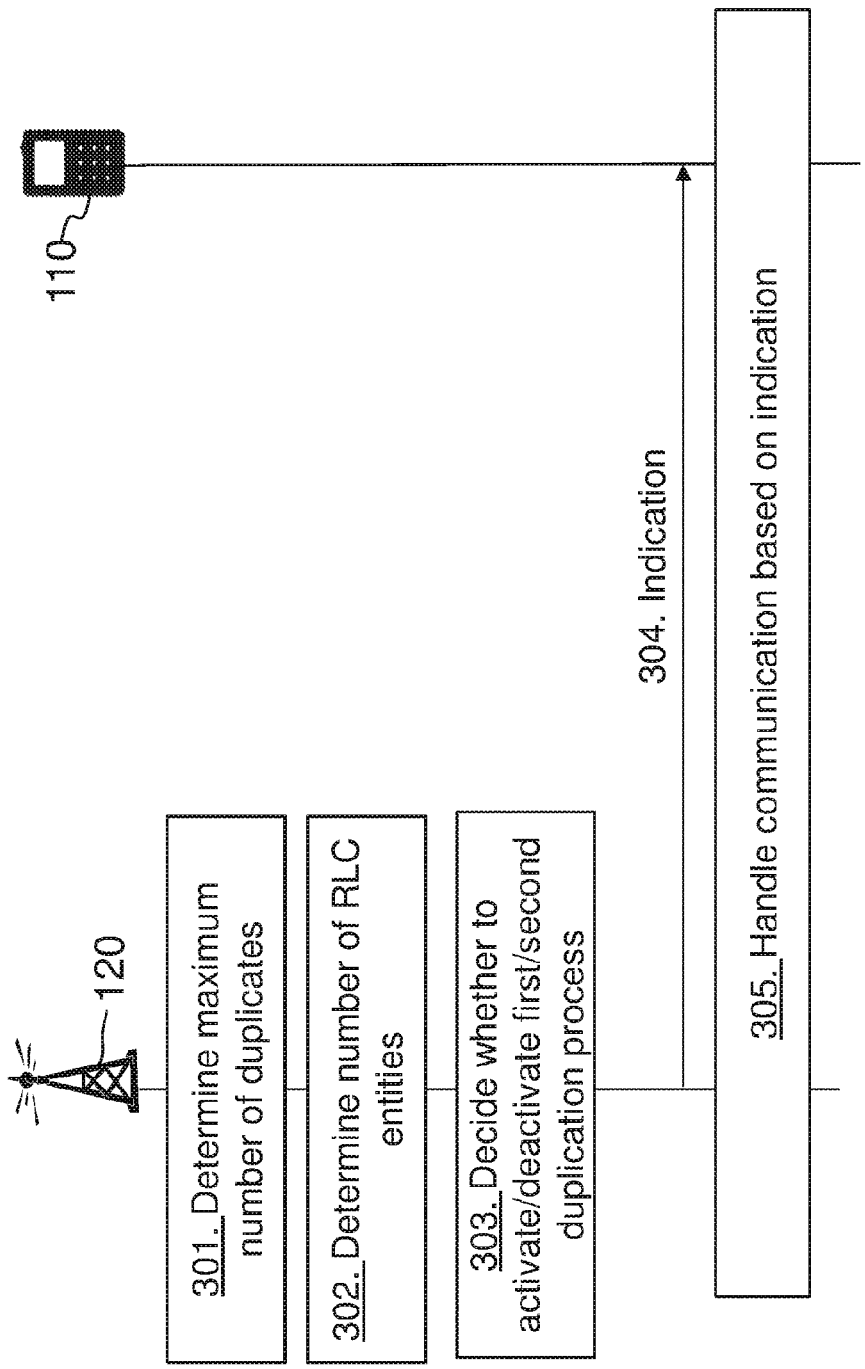

| R=0 | R=0 | LCID = Advance duplication | | | | | |
|---|---|---|---|---|---|---|---|
| | | Length | | | | | |
| Nr copies | | M/E | Leg | Leg | Leg | Leg | Leg8 |
| Leg1 | | Leg | | DRB | | | |
| Nr copies | | M/E | Leg | Leg | Leg | Leg | Leg8 |
| Leg1 | | Leg | | DRB | | | |

...

| Nr copies | M/E | Leg | Leg | Leg | Leg8 |
|---|---|---|---|---|---|
| Leg1 | Leg | | DRB | | |

Fig. 4B

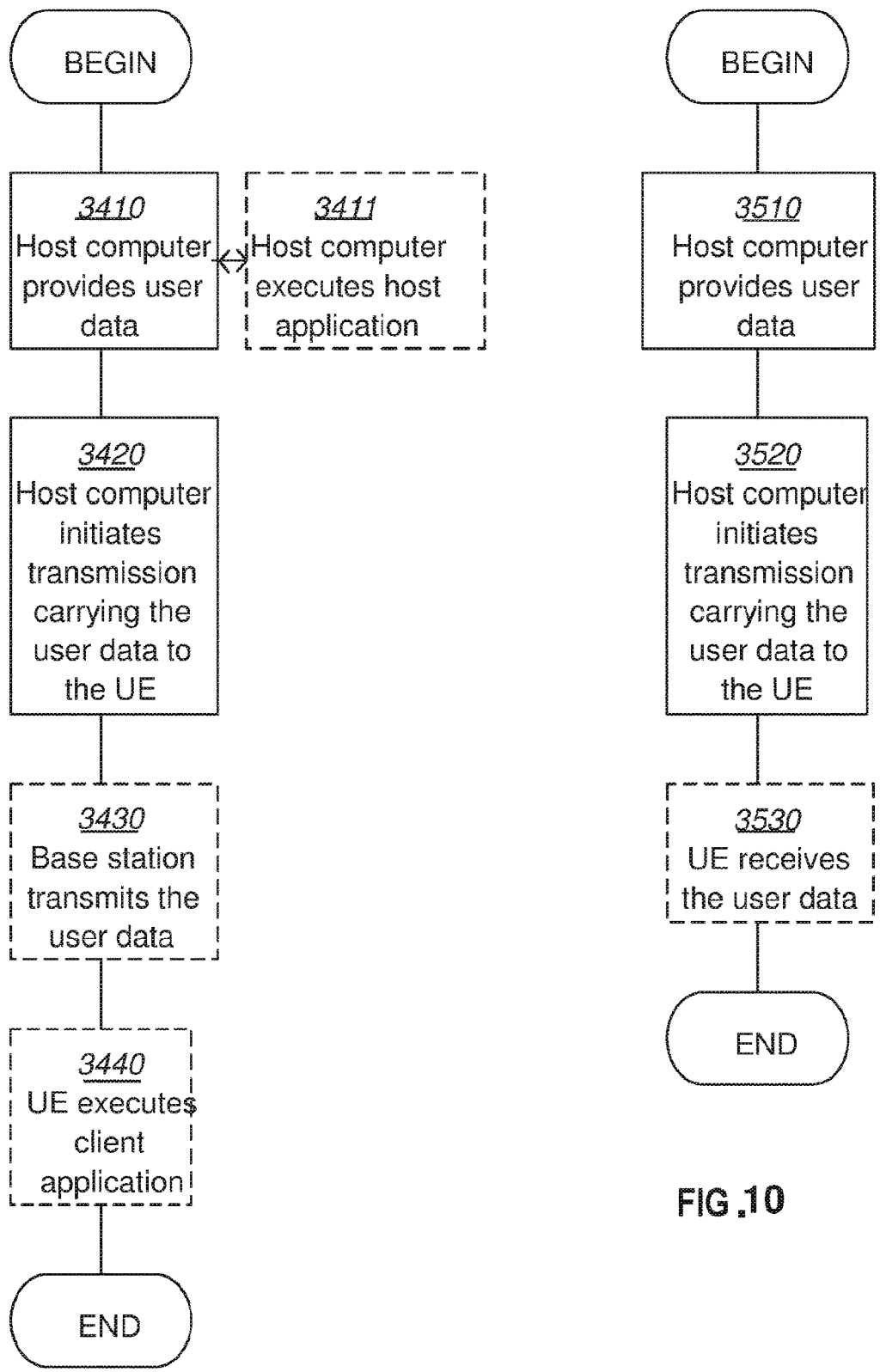

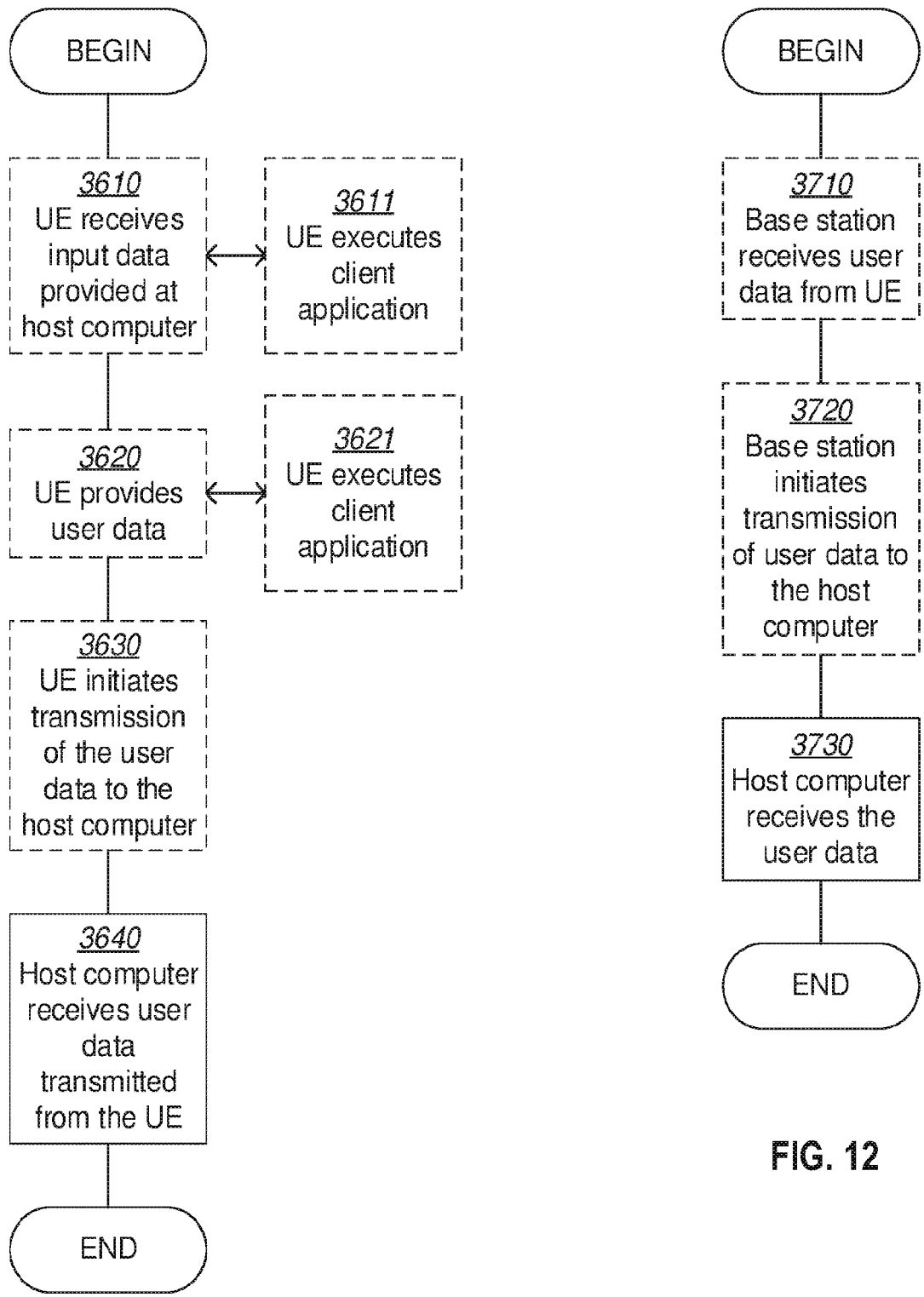

FIRST COMMUNICATION DEVICE, SECOND COMMUNICATION DEVICE AND METHODS PERFORMED THEREIN FOR CONTROLLING TRANSMISSION

This application is a 35 U.S.C. § 371 national phase filing of International Application No. PCT/SE2020/050080, filed Jan. 30, 2020, which claims the benefit of U.S. Provisional Application No. 62/799,773, filed Feb. 1, 2019, the disclosures of which are incorporated herein by reference in their entireties.

TECHNICAL FIELD

Embodiments herein relate to a first communication device, a second communication device and methods performed therein regarding wireless communication. Furthermore, a computer program product and a computer readable storage medium are also provided herein. In particular, embodiments herein relate to controlling transmission of one or more data packets in a wireless communication network.

BACKGROUND

In a typical wireless communication network, wireless devices, also known as wireless communication devices, mobile stations, stations (STA) and/or user equipment (UE), communicate via a Radio Access Network (RAN) with one or more core networks (CN). The RAN covers a geographical area which is divided into service areas or cells, with each service area or cell being served by a radio network node such as an access node e.g. a Wi-Fi access point or a radio base station (RBS), which in some networks may also be called, for example, a NodeB, a gNodeB, or an eNodeB. The service area or cell is a geographical area where radio coverage is provided by the radio network node. The radio network node operates on radio frequencies to communicate over an air interface with the wireless devices within range of the radio network node. The radio network node communicates over a downlink (DL) to the wireless device and the wireless device communicates over an uplink (UL) to the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipment. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3GPP and this work continues in the coming 3GPP releases, such as 4G and 5G networks such as New Radio (NR). The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

Embodiments herein are described within the context of 3GPP NR radio technology, 3GPP TS 38.300 V15.2.0 (2018-06). It is understood, that the embodiments herein are equally applicable to wireless access networks and UEs implementing other access technologies and standards. NR is used as an example technology in the embodiments herein, and using NR in the description therefore is particularly useful for understanding the problem and solutions solving the problem. In particular, the embodiments herein are applicable also to 3GPP LTE, or 3GPP LTE and NR integration, also denoted as non-standalone NR.

For NR, the dual connectivity (DC) or multi-connectivity protocol architecture of a split bearer is specified, building on the protocol architecture used for LTE for the DC split bearer. In DC the UE is connected to two distinct radio nodes. The UE maintains a packet data convergence protocol (PDCP) entity for the split bearer connected to multiple (at least two) radio link control (RLC) and medium access control (MAC) entities, as well as physical layer entities (PHY). These are each associated to a cell group, the master cell group and secondary cell group respectively. Transmission via the master cell group goes to the Master gNB, eNB in LTE terminology, MgNB; transmission via the secondary cell group goes to the Secondary gNB (eNB), SgNB. MgNB and SgNB maintain their own RLC and MAC entities associated to this single split bearer. A further node or function, packet processing function (PPF), which may be separate, or collocated with MgNB or SgNB, also denoted MN or SN, terminates the PDCP protocol on the network side. In this functional split, the centralized unit terminating PDCP may also be called centralized unit (CU) while the remaining nodes implementing the protocol layers below PDCP may be denoted distributed units (DUs). In DC, data units on PDCP may be routed ("split") via either lower layer or duplicated via both as further described below. From a PDCP point of view the routes via either RLC entity associated with master cell group or RLC entity associated with secondary cell group may also be denoted as transmission paths.

Furthermore, for NR, the carrier aggregation (CA) protocol architecture is specified. In carrier aggregation the UE is connected to one radio node via multiple, e.g. 2, carriers i.e. maintain two physical layers (PHY). Besides this, the protocol stack consists of one MAC, RLC and PDCP. This way, in CA, on MAC, data units to be transmitted may be routed via both carriers. An exception is packet duplication, where the protocol stack entails two RLC logical channels, to which PDCP routes duplicates, and where transmission of each RLC is done one a separate carrier by MAC. In this case, from PDCP point of view routing packets via the different RLC entities associated with the same MAC entity (cell group) may be denoted as different transmission paths.

Generally, when packet duplication is configured for a radio bearer by radio resource control (RRC) signalling, an additional RLC entity and an additional logical channel are added to the radio bearer to handle the duplicated PDCP Protocol Data Units (PDUs). Duplication at PDCP therefore consists in sending the same PDCP PDUs twice: once on the original RLC entity and a second time on the additional RLC entity. With two independent transmission paths, packet duplication is therefore used to increase reliability and reduces latency and is especially beneficial for ultra-reliable low latency (URLLC) services. When duplication occurs, the original PDCP PDU and the corresponding duplicate shall not be transmitted on the same carrier. The two different logical channels can either belong to the same MAC entity, as in CA, or to different ones, as in DC. In the former case, logical channel mapping restrictions are used in MAC to ensure that the logical channel carrying the original PDCP PDUs and logical channel carrying the corresponding duplicates are not sent on the same carrier. Once configured, duplication can be activated and de-activated per Data Radio Bearer (DRB) by means of a MAC control element (CE).

The MAC CE command for activating and deactivation PDCP data duplication is as shown in FIG. 1. Each bit indicates the activation status of the PDCP Duplication of a certain DRB, i, where i is the ascending order of the DRB ID among the DRBs configured with PDCP duplication and with RLC entity or RLC entities associated with this MAC entity.

In a newly defined 3GPP study item (RP-182090, Revised SID: Study on NR Industrial Internet of Things (IoT)), NR technology enhancements are studied with the target of providing more deterministic low-latency delivery of data. Two of the objectives of the Study Item is to enhance the efficiency of PDCP data duplication and to evaluate whether more than two copies, or identical packets, needs to be supported.

There are two different areas which have been suggested:

1) Transmission of multiple (m) copies of a PDCP PDU over a set (n) of all configured RLC entities: This means that the PDCP entity will create m copies of a PDCP PDU and will deliver one copy to each of the RLC entities which were configured for this purpose and are active.

2) Transmission of multiple copies, up to (m) copies of a PDCP PDU over a set of up to a number (n) of all configured RLC entities: This means that the PDCP entity can create 1 or more copies, up to a maximum of m copies, of a PDCP PDU and the PDCP entity will deliver each PDCP PDU copy once to a RLC entity from those configured.

The main difference between 1) and 2) is that in 1) all the created PDCP PDU copies are made available to the RLC entities when the PDCP PDU copies are created; while in 2) each PDCP PDU copy may be created and made available to a RLC entity depending on certain circumstances or triggers.

An example of 1) is as follows: PDCP creates a PDCP PDU in 3 copies, i.e. 3 identical PDCP PDUs, and transmits each copy to each of the 3 RLC entities available for this purpose.

An example of 2) is as follows: PDCP creates a PDCP PDU and transmits it over a first RLC entity at time t. After a period of time (t+delta), the PDCP entity creates a copy of the first transmitted PDCP PDU and transmits it over a second RLC entity.

SUMMARY

In a newly defined 3GPP study item (RP-182090, Revised SID: Study on NR Industrial Internet of Things (IoT)), NR technology enhancements are studied with the target of providing more deterministic low-latency delivery of data. Two of the objectives of the study item are to enhance the efficiency of packet duplication such as PDCP data duplication and to evaluate whether more than two copies, actual an original packet and a duplicate equals two duplicates or copies, i.e. transmission of more than two identical data packets each called a duplicate or copy, needs to be supported.

There is a need to decide on the signaling to support the features mentioned above e.g. examples 1) and 2).

An object herein is to provide a mechanism to enable communication in an efficient manner in a wireless communication network.

According to an aspect the object is achieved, according to embodiments herein, by providing a method performed by a first communication device, for controlling transmission of one or more data packets in a wireless communication network. The first communication device transmits an indication to another communication device, such as a second communication device, indicating one or more of the following: a maximum number of duplicates allowed to be transmitted for each data packet, such as a PDCP PDU; type of duplication; a data radio bearer (DRB) for which duplication is configured; a radio link control (RLC) entity that is allowed to transmit a duplicate; an order of RLC entities in which the second communication device should transmit a first data packet and following duplicates; whether duplication is activated or deactivated for a DRB.

According to another aspect the object is achieved, according to embodiments herein, by providing a method performed by a second communication device for controlling transmission of one or more data packets in a wireless communication network. The second communication device receives an indication from another communication device, such as the first communication device, indicating one or more of the following: a maximum number of duplicates allowed to be transmitted for each data packet; type of duplication; a DRB for which duplication is configured; an RLC entity that is allowed to transmit a duplicate; an order of RLC entities in which the second communication device should transmit a first data packet and following duplicates; whether duplication is activated or deactivated for a DRB.

According to another aspect of embodiments herein, the object is achieved by providing a first communication device for controlling transmission of one or more data packets in a wireless communication network. The first communication device is configured to transmit an indication to another communication device, such as a second communication device. The indication is adapted to indicate one or more of the following: a maximum number of duplicates allowed to be transmitted for each data packet; type of duplication; a DRB for which duplication is configured; an RLC entity that is allowed to transmit a duplicate; an order of RLC entities in which the second communication device should transmit a first data packet and following duplicates; whether duplication is activated or deactivated for a DRB.

According to another aspect of embodiments herein, the object is achieved by providing a second communication device for controlling transmission of one or more data packets in a wireless communication network. The second communication device is configured to receive an indication from another communication device, such as a first communication device. The indication is adapted to indicate one or more of the following: a maximum number of duplicates allowed to be transmitted for each data packet; type of duplication; a DRB for which duplication is configured; an RLC entity that is allowed to transmit a duplicate; an order of RLC entities in which the second communication device should transmit a first data packet and following duplicates; whether duplication is activated or deactivated for a DRB.

It is furthermore provided herein a computer program product comprising instructions, which, when executed on at least one processor, cause the at least one processor to carry out the method above, as performed by the first communication device and the second communication device, respectively. It is additionally provided herein a computer-readable storage medium, having stored thereon a computer program product comprising instructions which, when executed on at least one processor, cause the at least one processor to carry out the method according to the methods above, as performed by the first communication device and the second communication device, respectively.

Embodiments herein provide different signaling methods relating to duplication of packets to e.g. activate/deactivate first and/or second duplication processes and an advantage with embodiments herein is that embodiments herein enable the network (NW), i.e. the radio network node, an efficient of handling duplication of data packets such as handle number of duplicates, activation and deactivation of the first and/or second duplication processes.

BRIEF DESCRIPTION OF THE DRAWINGS

Embodiments will now be described in more detail in relation to the enclosed drawings, in which:

FIG. 3 is a combined flowchart and signalling scheme according to some embodiments herein;

FIG. 4B is a schematic overview depicting a MAC Control Element (CE) for controlling data duplication;

FIG. 9 shows methods implemented in a communication system including a host computer, a base station and a user equipment in accordance with some embodiments;

FIG. 10 shows methods implemented in a communication system including a host computer, a base station and a user equipment in accordance with some embodiments;

FIG. 11 shows methods implemented in a communication system including a host computer, a base station and a user equipment in accordance with some embodiments; and FIG. 12 shows methods implemented in a communication system including a host computer, a base station and a user equipment in accordance with some embodiments.

DETAILED DESCRIPTION

Figure 1:
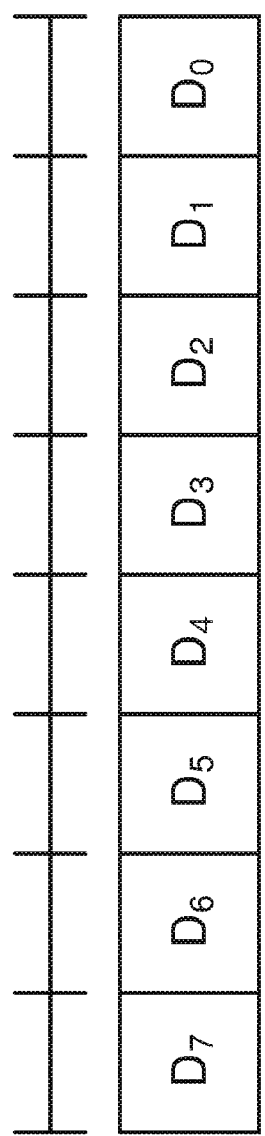
FIG. 1 is a block diagram depicting a MAC CE command for activation and deactivation of PDCP data duplication.
Figure 2:
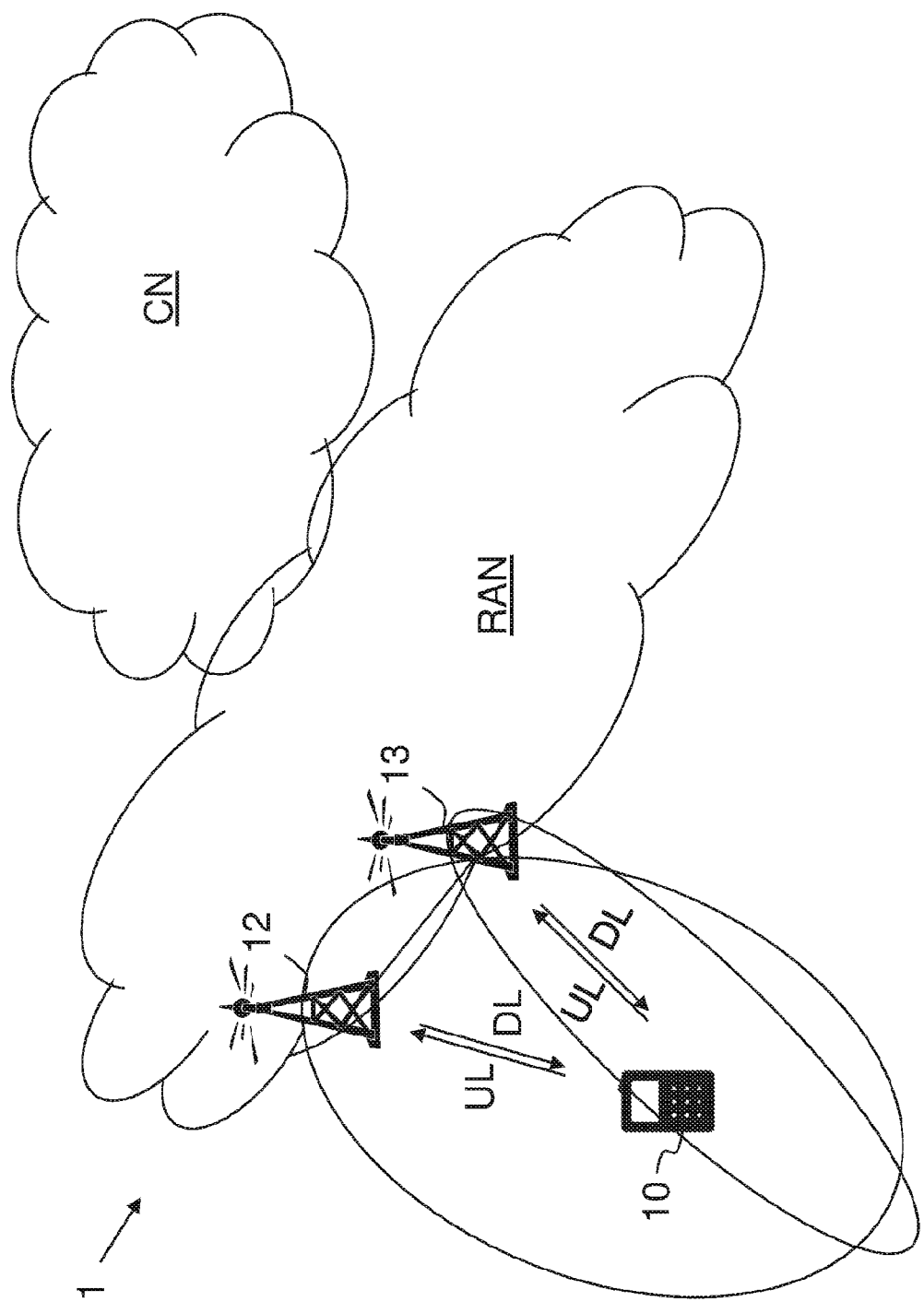
FIG. 2 is a schematic overview depicting a wireless communication network according to embodiments herein.

Embodiments herein relate to wireless communication networks in general. FIG. 2 is a schematic overview depicting a wireless communication network 1. The wireless communication network 1 comprises one or more RANs and one or more CNs. The wireless communication network 1 may use one or a number of different technologies. Embodiments herein relate to recent technology trends that are of particular interest in a New Radio (NR) context, however, embodiments are also applicable in further development of existing wireless communications systems such as e.g. LTE or Wideband Code Division Multiple Access (WCDMA).

In the wireless communication network 1, a wireless device 10 such as a mobile station, a non-access point (non-AP) station (STA), a STA, a user equipment and/or a wireless terminal, is comprised communicating via e.g. one or more Access Networks (AN), e.g. RAN, to one or more core networks (CN). It should be understood by the skilled in the art that "wireless device" is a non-limiting term which means any terminal, wireless communications terminal, user equipment, NB-IoT device, Machine Type Communication (MTC) device, Device to Device (D2D) terminal, or node e.g. smart phone, laptop, mobile phone, sensor, relay, mobile tablets or even a small base station capable of communicating using radio communication with a radio network node within an area served by the radio network node.

The wireless communication network 1 comprises a first radio network node 12 providing radio coverage over a geographical area, a first service area, of a first radio access technology (RAT), such as NR, LTE, or similar. The first radio network node 12 also denoted as the radio network node may be a transmission and reception point such as an access node, an access controller, a base station, e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a wireless device within the area served by the radio network node depending e.g. on the first radio access technology and terminology used. The radio network node may be referred to as a serving radio network node wherein the service area may be referred to as a serving cell, and the serving network node communicates with the wireless device in form of DL transmissions to the wireless device and UL transmissions from the wireless device. It should be noted that a service area may be denoted as cell, beam, beam group or similar to define an area of radio coverage. Furthermore is a second radio network node 13 is comprised in the wireless communication network providing radio coverage over a geographical area, a second service area, of a second radio access technology (RAT), such as NR, LTE, or similar. The second radio network node may be a transmission and reception point such as an access node, an access controller, a base station, e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a wireless device within the area served by the second radio network node depending e.g. on the second radio access technology and terminology used. The first RAT and the second RAT may be the same RAT or different RATs. The second radio network node may be referred to as a secondary serving radio network node wherein the service area may be referred to as a secondary serving cell, and the secondary serving radio network node communicates with the wireless device in form of DL transmissions to the wireless device and UL transmissions from the wireless device. It should be noted that a service area may be denoted as cell, beam, beam group or similar to define an area of radio coverage.

Embodiments herein relate to transmissions of duplicated packets such as PDCP PDUs using two or more RLC entities. The two or more RLC entities used for transmitting and/or receiving the duplicates may be comprised in a single communication device or in at least two communication devices. According to embodiments herein a first communication device 120, exemplified herein as the first radio network node 12, transmits an indication to a second communication device 110 exemplified as the wireless device 10. However, the first communication device 120 may be the wireless device 10 or the second radio network node 13 and the second communication device 110 may be the first radio network node 12 or the second radio network node 13. The communication devices may e.g. support one or more radio bearers e.g. a split bearer and may comprise one or more RLC entities for CA and/or DC.

The indication sent to the second communication device 110 indicates one or more of the following: a maximum number of duplicates allowed to be transmitted for each data packet; type of duplication; a DRB for which duplication is configured; a radio link control entity that is allowed to transmit a duplicate; an order of RLC entities in which the second communication device should transmit a first data packet and following duplicates; and/or whether duplication is activated or deactivated for a DRB.

In Industrial Internet of Things (IIoT), there may be cases in which data is delay intolerant and/or require very high reliability. PDCP data duplication may assist to achieve a high reliability as well as low latencies. This feature was introduced in 3GPP Release 15. PDCP data duplication consisted in transmitting two duplicated PDCP PDUs where each of them is transmitted once over each of the configured RLC entities. This may be configured over a DC architecture in which one RLC entity is in LTE and the second RLC entity is in NR, i.e. different RATs, or over a CA architecture in which the two configured RLC entities are only in NR, i.e. same RAT.

In 3GPP Release 16, it has been discussed two enhancements:

Increase the number of duplicates, m=number of duplicates; and

Increase the number of RLC entities, n=number of RLC entities.

With these enhancements, multiple PDCP duplicates can be transmitted over all or a subset of all configured RLC entities, thus, n_m. With regards terminology, a first duplication process denoted as multiple duplication will be used to mean that n≥m and that the duplicates are always transmitted and transmitted over the same RLC entities; and a second duplication process denoted as effective duplication will be used to mean that n≥m and where the duplicates are transmitted on a need basis or/and transmitted over RLC entities which can change over time, i.e. the RLC entities used may change from duplication to duplication wherein the first duplication process the RLC entities used may change from duplication to duplication.

The second duplication process, i.e. transmission of duplicates on a need basis e.g. when data packet is not delivered, may include the option of first transmitting a protocol data unit (PDU) on a primary leg i.e. on an RLC entity, and after some time, or when the PDU is considered as not successfully delivered, the PDU is retransmitted on this leg as well as a duplicate is transmitted on another or multiple other legs, i.e. other RLC entities.

Thus, the first duplication process, "multiple duplication", means that all multiple copies are always transmitted over e.g. a subset of RLC entities. These RLC entities may change over time, though as well as the number of multiple copies. For example, if the radio network node 12 configures the UE to transmit with two duplicates and has configured four RLC entities, the UE will always transmit two duplicates in two different RLC entities. These two RLC entities among the four RLC entities the UE had been configured may be signalled by the radio network node 12 or selected by other means, e.g. algorithm, UE, etc.

The main difference between the first duplication process, 'multiple duplication', and the second duplication process, 'effective duplication', is that in the first duplication process, the second communication device 110 always transmits all the duplicates that the first communication device 120 configured the second communication device 110 with, while in the second duplication process, the second communication device 110 may transmit up to a number of duplicates that the first communication device 120 configured the second communication device 110 with.

Following the example above, in the case of 'effective duplication', the e.g. UE may send a $1^{st}$ transmission over one of the two RLCs which are allowed or indicated for transmission. Upon a certain trigger, e.g. the UE may send a $2^{nd}$ duplicate over a second RLC entity which is allowed to perform a transmission of a duplicate.

FIG. 3 is a combined flowchart and signalling scheme according to some embodiments herein for controlling transmission of one or more data packets in the wireless communication network.

Action 301. The first communication device 120 may determine a maximum number of duplicates to be transmitted. This may be decided by e.g. radio network node 12 and may be based on how reliable and latency intolerant the connection is. If a traffic has a very low latency requirement and very high reliability, the radio network node 12 may configure two duplicates for instance. The lower the latency and higher the reliability, the higher the maximum number of duplicates may be. There is a tight connection with the reliability of lower layers e.g. L1. If the L1 reliability is 100%, one transmission would be ok.

Action 302. The first communication device 120 may determine a number of radio link control, RLC, entities for transmitting one or more duplicates. The number of RLC entities may be connected to the number of duplicates determined. There will be at least as many RLC entities as duplicates. However, the radio network node 12 may potentially configure more RLC entities to then choose the best entities to transmit the data. Number of RLC entities may be determined by the first communication device 120 based on UE capability and supported number of carriers or cells for example. The first communication device 120 may choose to configure more RLC entities than duplicates when e.g. it sees a variability of the reliability among the carriers, cells, or RLCs and would like to be able to quickly change or switch the subset of best RLC entities to be used for duplication, while e.g. a larger set of RLC entities is kept available to switch to. "Best entities" may mean that their paths can achieve at that time the lowest latency, or highest reliability for instance. Data transmitted in different RLC entities may also be transmitted by different cells (and different frequencies).

Action 303. The first communication device 120 may decide whether to activate the first duplication process and/or the second duplication process, and/or deactivate the first duplication process and/or the second duplication process for one or more DRBs. The first duplication process may imply that duplicates are transmitted over same RLC entities over time, and second duplication process may imply that duplicates are transmitted on a need basis and/or are transmitted over RLC entities which can change over time. Whether to activate and/or deactivate the first duplication process and/or the second duplication process may be based on a time or a timer that may be taken into account and/or latency requirement. The first duplication process may be preferred when the latency requirements are tight or high. The second duplication process implies that there is a first transmission and, after a period of time, there is a second transmission of the same data, a duplicate is transmitted. This implies a certain delay to trigger the second transmission and then some time to perform the transmission. When the traffic does not allow for such delay, then the first duplication process may be preferred. Another option is to configure or activate both the first and second duplication process. E.g. the first communication device 120 may indicate to perform the first duplication process with a number of two duplicates and a second duplication process with a number of up to four duplicates. This means that the second communication device 110 may transmit and/or receive two duplicates straight away, and may send one or two more duplicates at a later time with a total of up to four duplicates.

Action 304. The first communication device 120 transmits the indication to another communication device such as the second communication device 110 indicating one or more of the following: a maximum number of duplicates allowed to be transmitted for each data packet; type of duplication e.g. first or second duplication process; a DRB for which duplication is configured; a radio link control entity that is allowed to transmit a duplicate; an order of RLC entities in which the second communication device should transmit a first data packet and following duplicates; whether duplication is activated or deactivated for a DRB. The indication may be a real value or an index value in a table.

Action 305. The first communication device 120 and the second communication device 110 may then communicate as configured and/or indicated by the indication. E.g. the first communication device 120 may duplicate data packets and transmit one or more duplicates using the determined RLC entities. Transmissions may be handled over at least two radio link entities, e.g. at least two RLC entities that are distributed over one or more communication devices. Transmissions may be handled over more than two RLC entities.

Figure 4A:
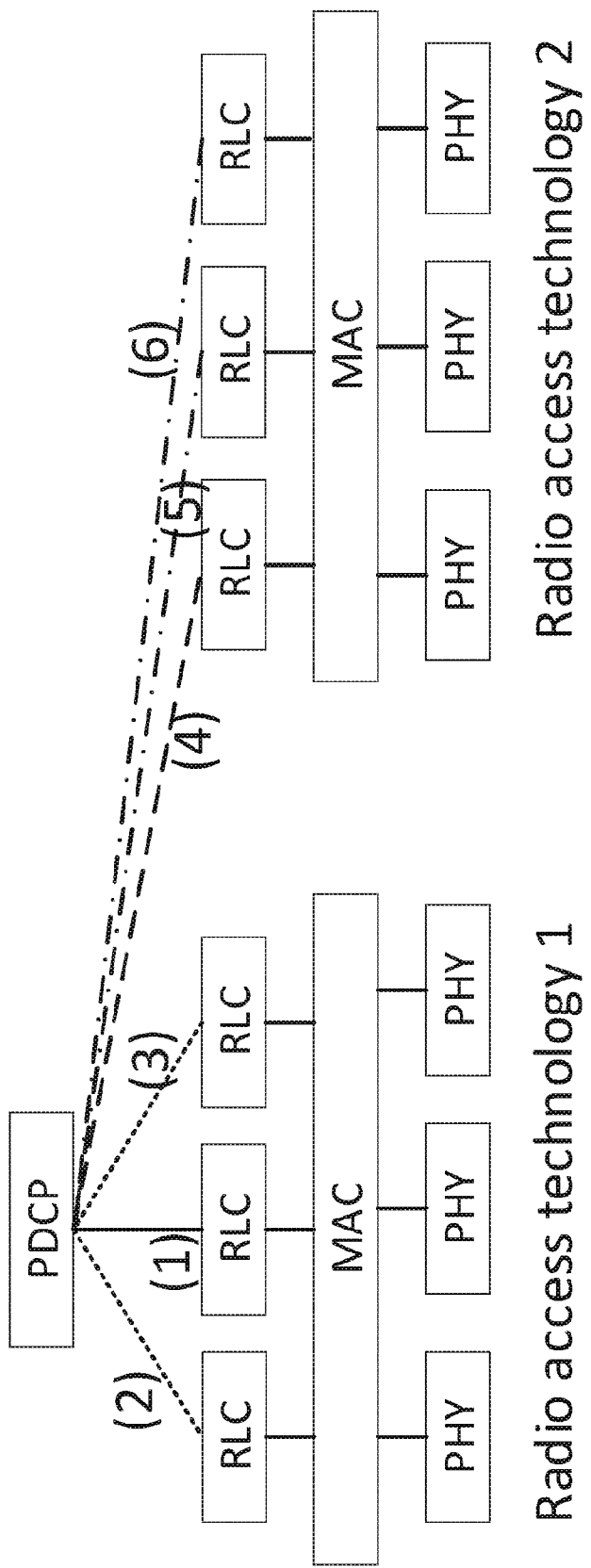
FIG. 4A is a schematic overview depicting a protocol architecture to support PDCP data duplication through different configurations.

FIG. 4A shows a protocol architecture to support PDCP data duplication through different configurations, DC, CA or a combination of these two (see background section), according to embodiments herein. FIG. 4A shows different potential configurations. For example, in 3GPP Release 15, PDCP data duplication could be configured with DC e.g. with the configuration of (1) and (4), or it could be configured with CA, e.g. with the configuration (1) and (2), or (1) and (3).

In 3GPP Release 16, it is discussed the possibility to configure multiple PDCP PDU copies, equivalent to PDCP data duplication with multiple copies, with the possibility to allow the configuration of more than two RLC entities. This could be implemented through different type of configurations, such as the one listed below:

CA in one radio technology or RAT, e.g. NR: this could be implemented with (1)-(2)-(3).

DC (LTE+NR)+CA (NR): this could be implemented, for example, with (1)-(4)-(5).

DC (LTE+NR)+CA (LTE): this could be implemented, for example, with (1)-(2)-(4).

DC (LTE+NR)+CA (LTE+NR): this could be implemented, for example, with (1)-(2)-(4)-(5).

A MAC Control Element (CE) may be used to control one or more of the following aspects:
  it can activate or deactivate multiple duplicate and/or effective duplication,
  it can configure the number of copies,
  it can configure the RLC entities (or legs) through which the copies should be transmitted or not transmitted.

FIG. 4B shows an example of MAC CE in which the NW e.g. the first radio network node 12 may indicate for each DRB if "advance duplication" is activated or deactivated, so that one or more of the following elements may be included:
  Nr copies: this field indicates the maximum number of copies (m) which may be transmitted for each PDCP PDU, number of copies also includes the original packet,
  M/E: this field indicates for which of the two features, multiple duplicates (M) or effective duplication (E), applies the configuration applied. In some cases, it may also indicate both options, so it would be up to the UE 10 to decide which one to apply. If effective duplication is configured, the field Nr copies may be interpreted differently, i.e. to indicate the number of duplicates to be sent after a certain trigger such as a timer while an initial transmission may happen without duplication.

In some cases, the combination of Nr copies and M/E may provide additional configuration possibilities. For instance, if Nr copies=0, it may deactivate the feature indicated in the M/E field. Similarly, setting all LegX to 0, i.e. cannot transmit a copy, could result in that the indicated feature in M/E is deactivated.

DRB: this field indicates the DRB for which the configuration given in the MAC CE applies
    The DRB may be identified by association with a logical channel for which duplication is configured in this MAC entity. Therefore, the DRB may be uniquely identified by providing a DRB ID, or by a Logical Channel ID (LCID).
  LegX: this field indicates which of the legs, i.e. RLC entities, may or may not transmit a copy.
    Each leg may be identified by LCIDs. The order of LCIDs provided may indicate a priority order of legs used for duplication.
    Or; a bitset may be provided, each bit identifying activation or deactivation of a logical channel belonging to this DRB, in order of ascending/descending LCIDs. In one option all logical channels of this DRB are considered, in another option only logical channels of this DRB in the MAC entity in which the MAC CE is received are considered.
  Leg Priority: when multiple legs are configured, the NW may also indicate the order in which the UE should transmit the first PDCP PDU transmission and the following duplicates. In some cases, an additional bit may be needed to indicate the presence of this field. When the leg priority is not indicated, the UE 10 may follow any indication previously signaled to the UE 10, for instance, by RRC signalling. Another option, when no information has been provided to the UE 10, the UE 10 may randomly select the legs from the set of available legs indicated in the MAC CE. When several legs are assigned the same priority, the UE 10 may choose the leg in which to do a transmission. FIG. 4B does not exemplify this field.

Figure 5A:
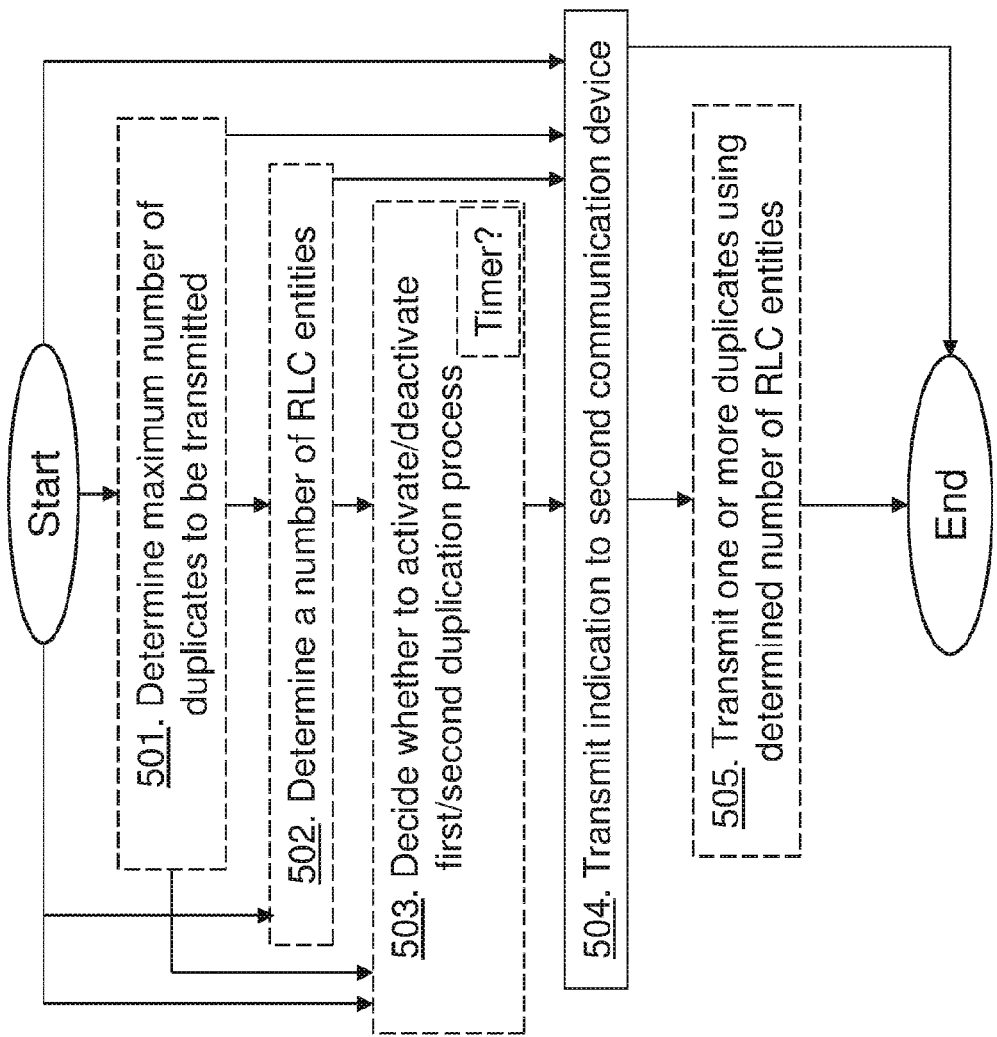
FIG. 5A is a schematic flowchart depicting a method performed by a first communication device according to embodiments herein.

The method actions performed by the first communication device 120, such as the first radio network node 12, for controlling transmission of one or more data packets in the wireless communication network 1 according to embodiments herein will now be described with reference to a flowchart depicted in FIG. 5A. The actions do not have to be taken in the order stated below, but may be taken in any suitable order. Actions performed in some embodiments are marked with dashed boxes.

Action 501. The first communication device 120 may determine the maximum number of duplicates to be transmitted.

Action 502. The first communication device 120 may determine a number of RLC entities for transmitting one or more duplicates.

Action 503. The first communication device 120 may decide whether to activate the first duplication process and/or the second duplication process, and/or deactivate the first duplication process and/or the second duplication process, for one or more DRBs. The first duplication process may imply that duplicates are transmitted over same RLC entities over time, and second duplication process may imply that duplicates are transmitted on a need basis and/or are transmitted over RLC entities which can change over time. Whether to activate and/or deactivate the first duplication process and/or the second duplication process may be based on a time or a timer that may be taken into account and/or latency requirement.

Action 504. The first communication device 120 transmits the indication to another communication device, such as the second communication device 110. The indication indicates one or more of the following: the maximum number of duplicates allowed to be transmitted for each data packet; the type of duplication; the DRB for which duplication is configured; the RLC entity that is allowed to transmit a duplicate; the order of RLC entities in which the second communication device 110 should transmit a first data packet and following duplicates; and/or whether duplication is activated or deactivated for a DRB.

Action 505. The first communication device 120 and the second communication device 110 may then communicate as configured and/or indicated by the indication. E.g. the first communication device 110 may duplicate data packets and transmit one or more duplicates using the determined RLC entities. Transmissions may be handled over at least two radio link entities, e.g. at least two RLC entities that are distributed over one or more communication devices. Transmissions may be handled over more than two RLC entities. E.g. the second communication device 110 may then handle communication based on the received indication from the first communication device 120.

Figure 5B:
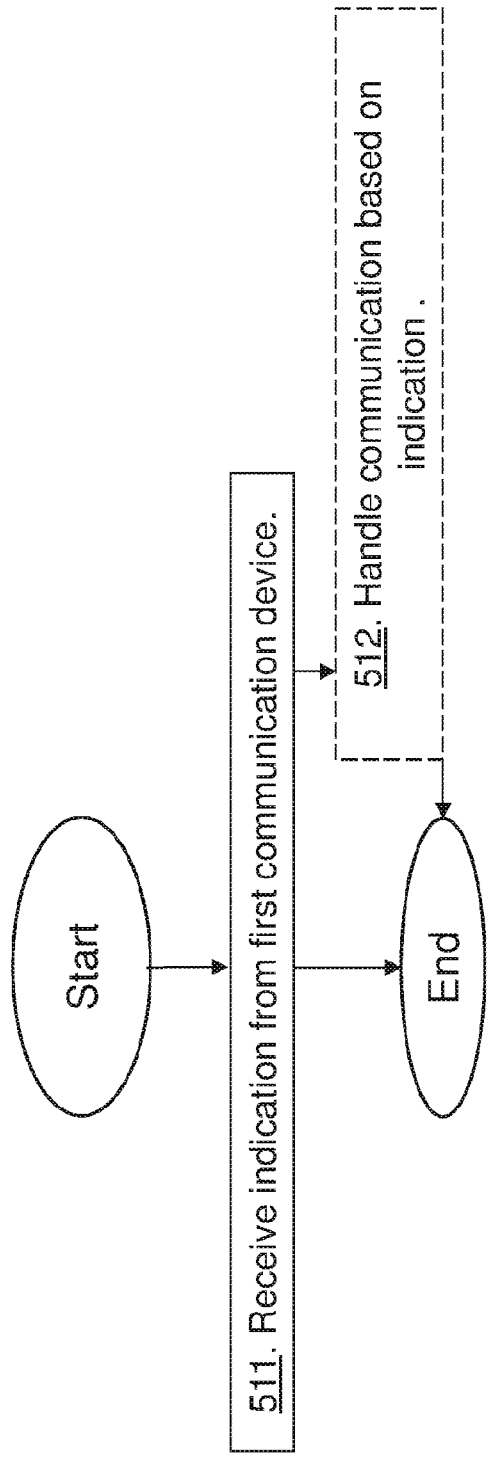
FIG. 5B is a schematic flowchart depicting a method performed by a second communication device according to embodiments herein.

The method actions performed by the second communication device 110, such as the wireless device 10, for controlling transmission of one or more data packets in the wireless communication network 1 according to embodiments herein will now be described with reference to a flowchart depicted in FIG. 5B. The actions do not have to be taken in the order stated below, but may be taken in any suitable order. Actions performed in some embodiments are marked with dashed boxes.

Action 511. The second communication device 110 receives the indication from another communication device, such as the first communication device 120. The indication indicates one or more of the following: the maximum number of duplicates allowed to be transmitted for each data packet; the type of duplication; the DRB for which duplication is configured; the RLC entity that is allowed to transmit a duplicate; the order of RLC entities in which the second communication device 110 should transmit the first data packet and following duplicates; and/or whether duplication is activated or deactivated for a DRB.

The first communication device 120 and the second communication device 110 may then communicate as configured and/or indicated by the indication. Transmission may be handled over at least two radio link entities, e.g. at least two RLC entities that are distributed over one or more communication devices. Transmission may be handled over more than two RLC entities.

Action 512. The second communication device 110 may thus then handle communication e.g. transmit a data packet as indicated by the indication or receive duplicates of a data packet, as indicated by the indication. Transmissions may be handled over at least two radio link entities, e.g. at least two RLC entities that are distributed over one or more communication devices. Transmissions may be handled over more than two RLC entities. E.g. the indication may inform the second communication device which RLC entities to use, how many duplicates and similar.

Figure 6A:
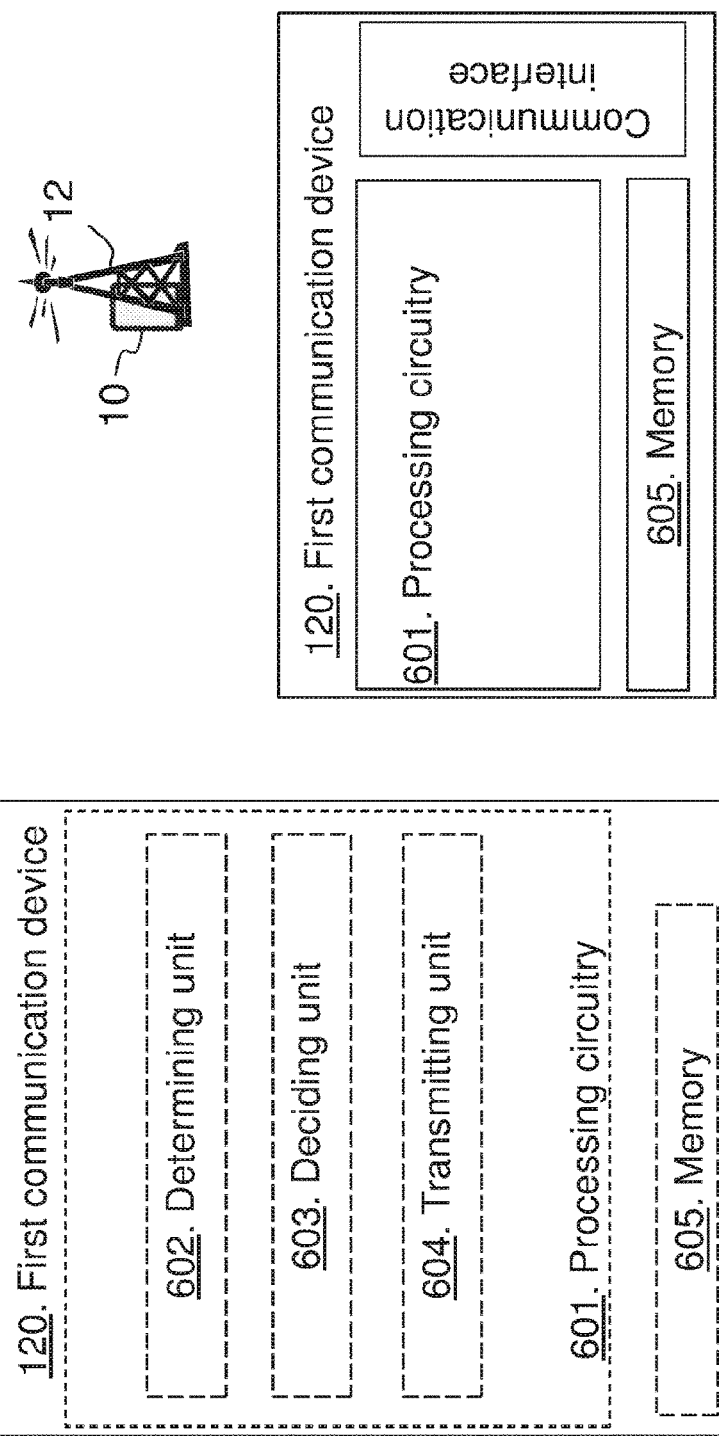
FIG. 6A is a block diagram depicting a first communication device according to embodiments herein.

FIG. 6A is a block diagram depicting the first communication device 120, such as the radio network node 12, for controlling transmission of one or more data packets in the wireless communication network 1 according to embodiments herein.

The first communication device 120 may comprise processing circuitry 601, e.g. one or more processors, configured to perform the methods herein.

The first communication device 120 may comprise a determining unit 602. The communication device 120, the processing circuitry 601, and/or the determining unit 602 may be configured to determine the maximum number of duplicates to be transmitted. The communication device 120, the processing circuitry 601, and/or the determining unit 602 may further be configured to determine the number of RLC entities for transmitting one or more duplicates.

The first communication device 120 may comprise a deciding unit 603. The communication device 120, the processing circuitry 601, and/or the deciding unit 603 is configured to decide whether to activate the first duplication process and/or the second duplication process, and/or deactivate the first duplication process and/or the second duplication process, for one or more DRBs. The first duplication process may be adapted to imply that duplicates are transmitted over same RLC entities over time, and the second duplication process may be adapted to imply that duplicates are transmitted on a need basis and/or are transmitted over RLC entities which can change over time. Deciding whether to activate and/or deactivate the first duplication process and/or the second duplication process may be taking a timer into account and/or a latency requirement.

The first communication device 120 comprises a transmitting unit 604, e.g. a transmitter or a transceiver or module. The first communication device 120, the processing circuitry 601, and/or the transmitting unit 604 is configured to transmit the indication to another communication device, such as the second communication device 110, adapted to indicate one or more of the following: the maximum number of duplicates allowed to be transmitted for each data packet; the type of duplication; the DRB for which duplication is configured; the RLC entity that is allowed to transmit a duplicate; the order of RLC entities in which the second communication 110 device should transmit a first data packet and following duplicates; whether duplication is activated or deactivated for a DRB. The first communication device 120, the processing circuitry 601, and/or the transmitting unit 604 may further be configured to handle communication by transmitting (or configured to transmit) one or more duplicates using the determined RLC entities. Transmission may be adapted to be handled over at least two RLC entities, wherein the at least two RLC entities may be adapted to be distributed over one or more communication devices. The transmission may be adapted to be handled over more than two RLC entities.

The first communication device 120 further comprises a memory 605. The memory comprises one or more units to be used to store data on, such as data packets, DRBs, RLCs, events, applications to perform the methods disclosed herein when being executed, and similar. Furthermore, the first communication device 120 may comprise a communication interface such as comprising a transmitter, a receiver and/or a transceiver and/or one or more antennas.

The methods according to the embodiments described herein for the first communication device 120 are respectively implemented by means of e.g. a computer program product 606 or a computer program, comprising instructions, i.e., software code portions, which, when executed on at least one processor, cause the at least one processor to carry out the actions described herein, as performed by the first communication device 120. The computer program product 606 may be stored on a computer-readable storage medium 607, e.g. a disc, a universal serial bus (USB) stick or similar. The computer-readable storage medium 607, having stored thereon the computer program product, may comprise the instructions which, when executed on at least one processor, cause the at least one processor to carry out the actions described herein, as performed by the first communication device 120. In some embodiments, the computer-readable storage medium may be a transitory or a non-transitory computer-readable storage medium. Thus, embodiments herein may disclose a first communication device for controlling transmission of one or more data packets in a wireless communication network, wherein the first communication device comprises processing circuitry and a memory, said memory comprising instructions executable by said processing circuitry whereby said first communication device is operative to perform any of the methods herein.

Figure 6B:
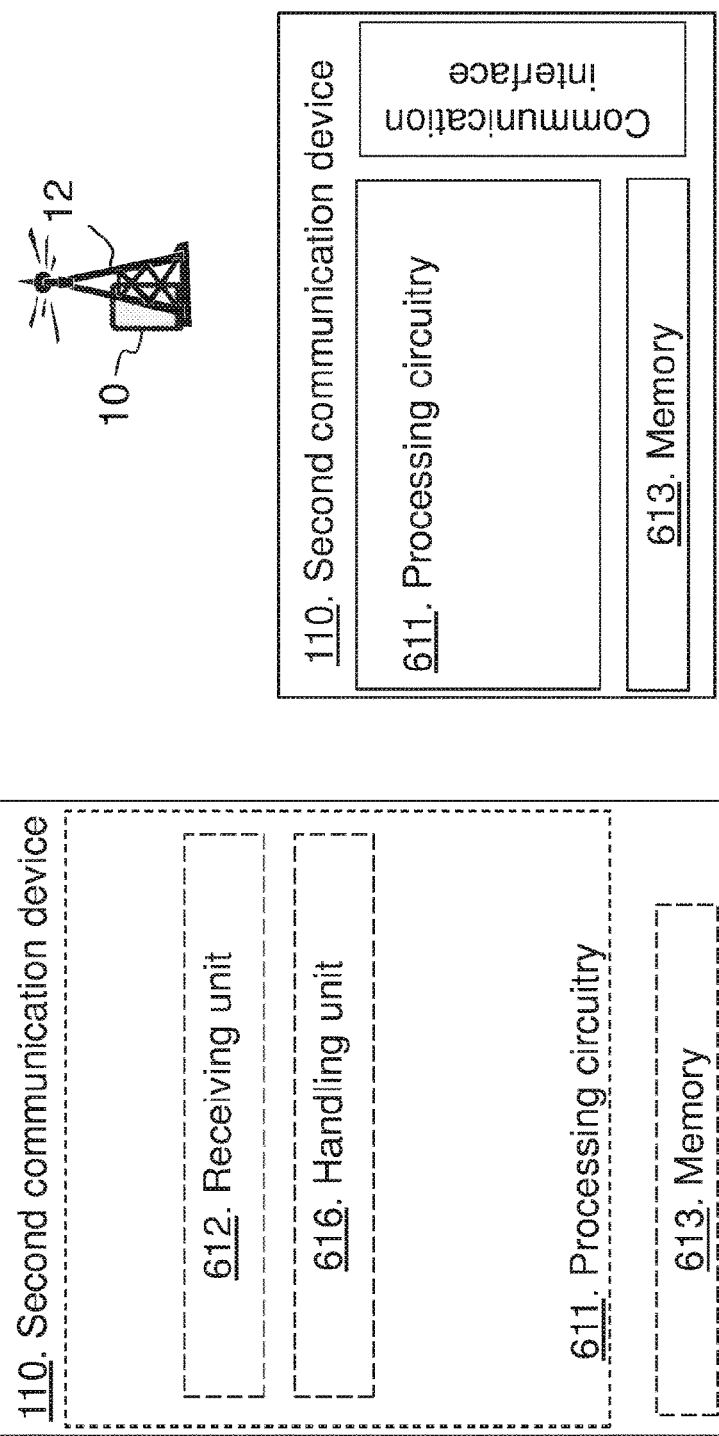
FIG. 6B is a block diagram depicting a second communication device according to embodiments herein.

FIG. 6B is a block diagram depicting the second communication device 110, such as the wireless device 10, for controlling transmission of one or more data packets in a wireless communication network 1 according to embodiments herein.

The second communication device 110 may comprise processing circuitry 611, e.g. one or more processors, configured to perform the methods herein.

The second communication device 110 comprises a receiving unit 612, e.g. a receiver or a transceiver or module. The second communication device 110, the processing circuitry 611, and/or the receiving unit 612 is configured to receive an indication from another communication device, such as the first communication device 120, adapted to indicate one or more of the following: the maximum number of duplicates allowed to be transmitted for each data packet; the type of duplication; the DRB for which duplication is configured; the RLC entity that is allowed to transmit a duplicate; the order of RLC entities in which the second communication device 110 should transmit a first data packet and following duplicates; and/or whether duplication is activated or deactivated for a DRB.

The second communication device 110 may comprise a handling unit 616. The second communication device 110, the processing circuitry 611, and/or the handling unit 616 may be configured to handle communication based on the received indication, e.g. transmit a data packet as indicated by the indication or receive duplicates of a data packet as indicated by the indication. Transmissions may be handled over at least two radio link entities, e.g. at least two RLC entities that are distributed over one or more communication devices. Transmissions may be handled over more than two RLC entities.

The second communication device 110 further comprises a memory 613. The memory comprises one or more units to be used to store data on, such as data packets, DRBs, RLC entities, events, applications to perform the methods disclosed herein when being executed, and similar. Furthermore, the second communication device 110 may comprise a communication interface such as comprising a transmitter, a receiver and/or a transceiver and/or one or more antennas.

The methods according to the embodiments described herein for the second communication device 110 are respectively implemented by means of e.g. a computer program product 614 or a computer program, comprising instructions, i.e., software code portions, which, when executed on at least one processor, cause the at least one processor to carry out the actions described herein, as performed by the second communication device 110. The computer program product 614 may be stored on a computer-readable storage medium 615, e.g. a disc, a universal serial bus (USB) stick or similar. The computer-readable storage medium 615, having stored thereon the computer program product, may comprise the instructions which, when executed on at least one processor, cause the at least one processor to carry out the actions described herein, as performed by the second communication device 110. In some embodiments, the computer-readable storage medium may be a transitory or a non-transitory computer-readable storage medium. Thus, embodiments herein may disclose a second communication device for controlling transmission of one or more data packets in a wireless communication network, wherein the second communication device comprises processing circuitry and a memory, said memory comprising instructions executable by said processing circuitry whereby said second communication device is operative to to perform any of the methods herein.

In some embodiments a more general term "radio network node" is used and it can correspond to any type of radio-network node or any network node, which communicates with a wireless device and/or with another network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment (UE) is used and it refers to any type of wireless device communicating with a network node and/or with another wireless device in a cellular or mobile communication system. Examples of UE are target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

Embodiments are applicable to any RAT or multi-RAT systems, where the wireless device receives and/or transmit signals (e.g. data) e.g. New Radio (NR), Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions means or circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

Some example Embodiments numbered 1-26 are described below.

Embodiment 1. A method performed by a first communication device (120) for controlling transmission of one or more data packets in a wireless communication network (1), the method comprising:
transmitting (504) an indication, to a second communication device (110), indicating one or more of the following: a maximum number of duplicates allowed to be transmitted for each data packet; type of duplication; a data radio bearer, DRB, for which duplication is configured; a radio link control, RLC, entity that is allowed to transmit a duplicate; an order of RLC entities in which the second communication device (110) should transmit a first data packet and following duplicates; whether duplication is activated or deactivated for a DRB.

Embodiment 2. The method according to embodiment 1, further comprising
deciding (503) whether to activate a first duplication process and/or a second duplication process, and/or deactivate the first duplication process and/or the second duplication process for one or more DRBs.

Embodiment 3. The method according to embodiment 2, wherein the first duplication process implies that duplicates are transmitted over same RLC entities over time, and the second duplication process implies that duplicates are transmitted on a need basis and/or are transmitted over RLC entities which can change over time.

Embodiment 4. The method according to any of the embodiments 2-3, wherein deciding whether to activate and/or deactivate the first duplication process and/or the second duplication process is taking a timer into account.

Embodiment 5. The method according to any of the embodiments 1-4, further comprising
determining (501) the maximum number of duplicates to be transmitted.

Embodiment 6. The method according to any of the embodiments 1-5, further comprising
determining (502) a number of radio link control, RLC, entities for transmitting one or more duplicates.

Embodiment 7. The method according to embodiment 6, further comprising:
transmitting (505) one or more duplicates using the determined RLC entities.

Embodiment 8. The method according to any of the embodiments 1-7, wherein transmission is handled over at least two radio link entities.

Embodiment 9. The method according to embodiment 8, wherein the at least two RLC entities are distributed over one or more communication devices.

Embodiment 10. The method according to any of the embodiments 1-9, wherein transmission is handled over more than two RLC entities.

Embodiment 11. A method performed by a second communication device (110) for controlling transmission of one or more data packets in a wireless communication network (1), the method comprising:
receiving (511) an indication, from a first communication device (120), indicating one or more of the following: a maximum number of duplicates allowed to be transmitted for each data packet; type of duplication; a data radio bearer, DRB, for which duplication is configured; a radio link control, RLC, entity that is allowed to transmit a duplicate; an order of RLC entities in which the second communication device (110) should transmit a first data packet and following duplicates; whether duplication is activated or deactivated for a DRB.

Embodiment 12. The method according to embodiment 11, further comprising
handling (512) communication based on the received indication.

Embodiment 13. A first communication device (120) for controlling transmission of one or more data packets in a wireless communication network (1), wherein the first communication device (120) is configured to:
transmit an indication to a second communication device (110) adapted to indicate one or more of the following: a maximum number of duplicates allowed to be transmitted for each data packet; type of duplication; a data radio bearer, DRB, for which duplication is configured; a radio link control, RLC, entity that is allowed to transmit a duplicate; an order of RLC entities in which the second communication device (110) should transmit a first data packet and following duplicates; whether duplication is activated or deactivated for a DRB.

Embodiment 14. The first communication device (120) according to embodiment 13, further being configured to:
decide whether to activate a first duplication process and/or a second duplication process, and/or deactivate the first duplication process and/or the second duplication process for one or more DRBs.

Embodiment 15. The first communication device (120) according to embodiment 14, wherein the first duplication process is adapted to imply that duplicates are transmitted over same RLC entities over time, and the second duplication process is adapted to imply that duplicates are transmitted on a need basis and/or are transmitted over RLC entities which can change over time.

Embodiment 16. The first communication device (120) according to any of the embodiments 14-15, wherein deciding whether to activate and/or deactivate the first duplication process and/or the second duplication process is taking a timer into account.

Embodiment 17. The first communication device (120) according to any of the embodiments 13-16, further being configured to:
determine the maximum number of duplicates to be transmitted.

Embodiment 18. The first communication device (120) according to any of the embodiments 13-17, further being configured to:
determine a number of radio link control, RLC, entities for transmitting one or more duplicates.

Embodiment 19. The first communication device (120) according to embodiment 18, further being configured to:
transmit one or more duplicates using the determined RLC entities.

Embodiment 20. The first communication device (120) according to any of the embodiments 13-19, wherein transmission is adapted to be handled over at least two radio link entities.

Embodiment 21. The first communication device (120) according to embodiment 19, wherein the at least two RLC entities are adapted to be distributed over one or more communication devices.

Embodiment 22. The first communication device (120) according to any of the embodiments 12-20, wherein transmission is adapted to be handled over more than two RLC entities.

Embodiment 23. A second communication device (110) for controlling transmission of one or more data packets in a wireless communication network (1), wherein the second communication device (110) is configured to:
receive an indication, from a first communication device (120), adapted to indicate one or more of the following: a maximum number of duplicates allowed to be transmitted for each data packet; type of duplication; a data radio bearer, DRB, for which duplication is configured; a radio link control, RLC, entity that is allowed to transmit a duplicate; an order of RLC entities in which the second communication device (110) should transmit a first data packet and following duplicates; whether duplication is activated or deactivated for a DRB, and Embodiment 24. The second communication device (110) according to embodiment 23, further being configured to:
handle communication based on the received indication.

Embodiment 25. A computer program comprising instructions, which when executed by a processor, causes the processor to perform actions according to any of the embodiments 1-12.

Embodiment 26. A carrier comprising the computer program of embodiment 25, wherein the carrier is one of an electronic signal, an optical signal, an electromagnetic signal, a magnetic signal, an electric signal, a radio signal, a microwave signal, or a computer-readable storage medium.

Figure 7:
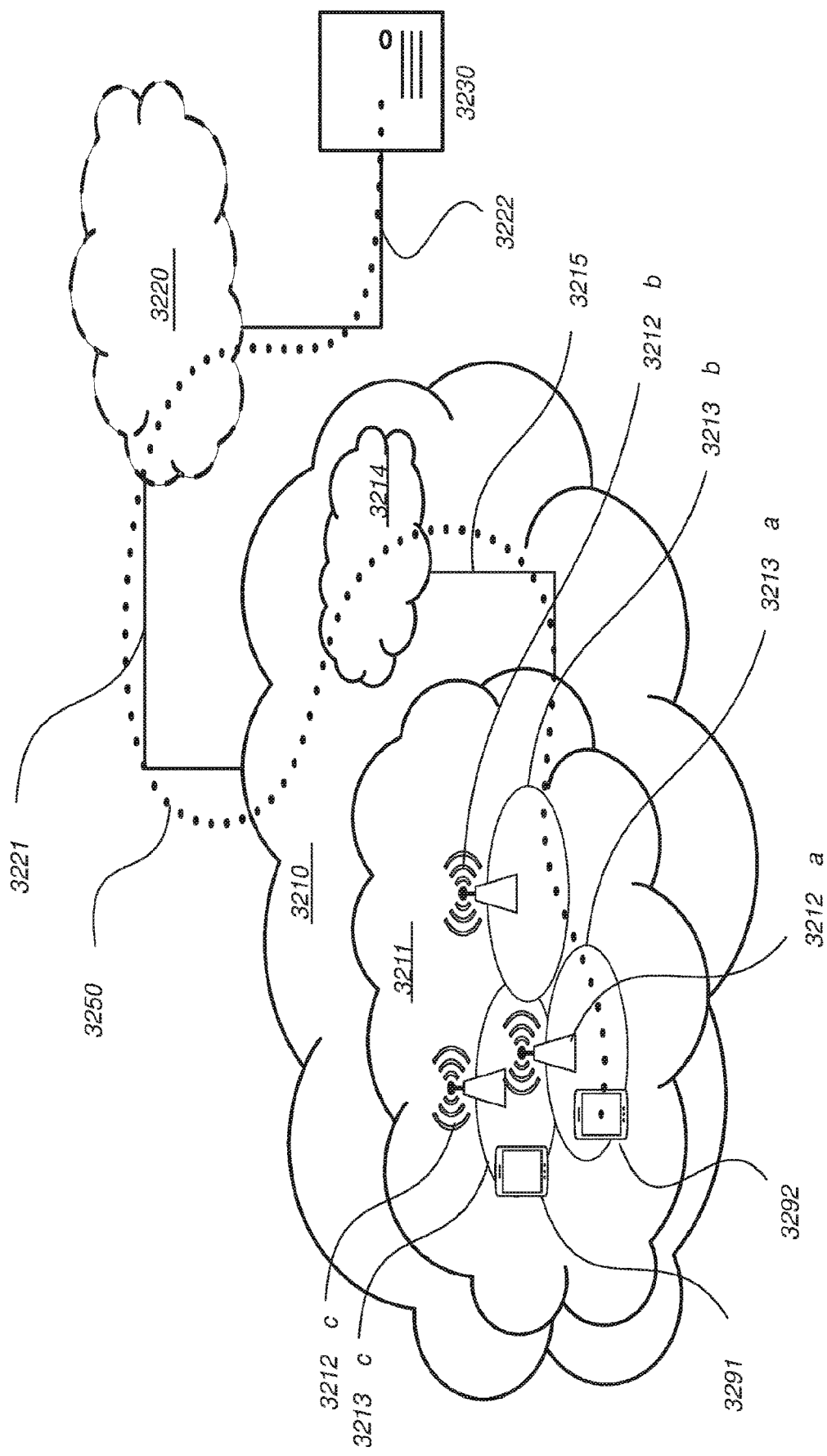
FIG. 7 shows a telecommunication network connected via an intermediate network to a host computer in accordance with some embodiments.

FIG. 7 shows a Telecommunication network connected via an intermediate network to a host computer in accordance with some embodiments. With reference to FIG. 7, in accordance with an embodiment, a communication system includes telecommunication network 3210, such as a 3GPP-type cellular network, which comprises access network 3211, such as a radio access network, and core network 3214. Access network 3211 comprises a plurality of base stations 3212a, 3212b, 3212c, such as NBs, eNBs, gNBs or other types of wireless access points being examples of the radio network node 12 above, each defining a corresponding coverage area 3213a, 3213b, 3213c. Each base station 3212a, 3212b, 3212c is connectable to core network 3214 over a wired or wireless connection 3215. A first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example being examples of the wireless device 10 above, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 7 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Figure 8:
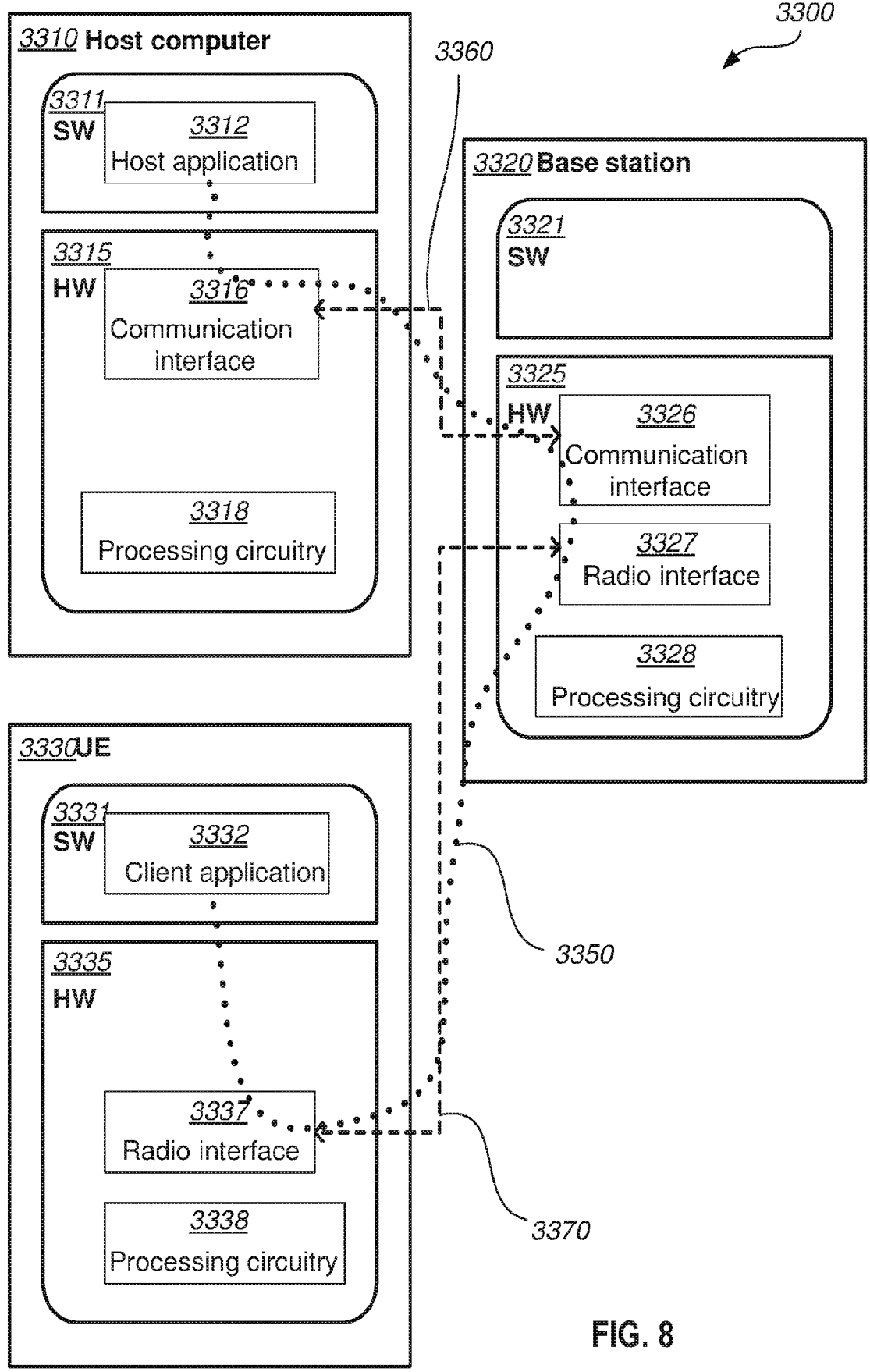
FIG. 8 shows a host computer communicating via a base station with a user equipment over a partially wireless connection in accordance with some embodiments.

FIG. 8: Host computer communicating via a base station with a user equipment over a partially wireless connection in accordance with some embodiments Example implementations, in accordance with an embodiment, of the UE, base station and host computer discussed in the preceding paragraphs will now be described with reference to FIG. 8. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 8) served by base station 3320. Communication interface 3326 may be configured to facilitate connection 3360 to host computer 3310. Connection 3360 may be direct or it may pass through a core network (not shown in FIG. 8) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. It's hardware 3333 may include radio interface 3337 configured to set up and maintain wireless connection 3370 with a base station serving a coverage area in which UE 3330 is currently located. Hardware 3333 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

It is noted that host computer 3310, base station 3320 and UE 3330 illustrated in FIG. 8 may be similar or identical to host computer 3230, one of base stations 3212*a*, 3212*b*, 3212*c* and one of UEs 3291, 3292 of FIG. 7, respectively. This is to say, the inner workings of these entities may be as shown in FIG. 8 and independently, the surrounding network topology may be that of FIG. 7.

In FIG. 8, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the latency since number of duplicates may increase rate and accuracy and thereby provide benefits such as reduced waiting time and better responsiveness.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3333 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

FIG. 9: Methods implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

FIG. 10: Methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

FIG. 11: Methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

FIG. 12: Methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

| Abbreviation | Explanation |
|---|---|
| NR | New Radio |
| 3GPP | 3rd Generation Partnership Project |
| TS | Technical Specification |
| UE | User Equipment |
| LTE | Long Term Evolution |
| DC | Dual Connectivity |
| PDCP | Packet Data Convergence Protocol |
| RLC | Radio Link Controller |
| PHY | Physical Layer |
| gNB | g-Node-B |
| MN | Master Node |
| SN | Secondary Node |
| CU | Centralized Unit |
| DU | Distributed Unit |
| CA | Carrier Aggregation |
| MAC | Medium Access Protocol |
| URLLC | Ultra-Reliable Low Latency |
| DRB | Data Radio Bearer |
| PDU | Protocol Data Unit |
| LCID | Logical Channel ID |
| CE | Control Element |

The invention claimed is:

1. A method performed by a first communication device for controlling transmission of one or more data packets in a wireless communication network, the method comprising:
    transmitting an indication, to a second communication device, indicating one or more of the following: a maximum number of duplicates allowed to be transmitted for each data packet, a type of duplication, a data radio bearer (DRB) for which duplication is configured, a radio link control (RLC) entity that is allowed to transmit a duplicate, an order of RLC entities in which the second communication device should transmit a first data packet and following duplicates, and whether the duplication is activated or deactivated for a DRB; and deciding whether to activate a first duplication process and/or a second duplication process, and/or deactivate the first duplication process and/or the second duplication process for one or more DRBs, wherein the first duplication process implies that the duplicates are transmitted over same RLC entities over time, and the second duplication process implies that the duplicates are transmitted on a need basis and/or are transmitted over RLC entities that can change over time.

2. The method according to claim 1, wherein deciding whether to activate and/or deactivate the first duplication process and/or the second duplication process is taking a timer into account.

3. The method according to claim 1, further comprising determining the maximum number of duplicates to be transmitted.

4. The method according to claim 1, further comprising determining a number of RLC entities for transmitting one or more duplicates.

5. The method according to claim 4, further comprising: transmitting the one or more duplicates using the determined number of RLC entities.

6. The method according to claim 1, wherein the transmission is handled over at least two RLC entities.

7. A method performed by a second communication device for controlling transmission of one or more data packets in a wireless communication network, the method comprising:

receiving an indication, from a first communication device, indicating one or more of the following: a maximum number of duplicates allowed to be transmitted for each data packet, a type of duplication, a data radio bearer (DRB) for which duplication is configured, a radio link control (RLC) entity that is allowed to transmit a duplicate, an order of RLC entities in which the second communication device should transmit a first data packet and following duplicates, and whether the duplication is activated or deactivated for a DRB; and handling communication based on the received indication, the handling comprises receiving duplicates according to a first duplication process and/or a second duplication process, based on whether the first communication device decided to activate the first duplication process and/or the second duplication process, and/or deactivate the first duplication process and/or the second duplication process for one or more DRBs, wherein the first duplication process implies that the duplicates are transmitted over same RLC entities over time, and the second duplication process implies that the duplicates are transmitted on a need basis and/or are transmitted over RLC entities that can change over time.

8. A first communication device for controlling transmission of one or more data packets in a wireless communication network, wherein the first communication device comprises a communication interface and processing circuitry associated with the communication interface, the processing circuitry is configured to:

transmit an indication to a second communication device adapted to indicate one or more of the following: a maximum number of duplicates allowed to be transmitted for each data packet, a type of duplication, a data radio bearer (DRB) for which duplication is configured, a radio link control (RLC) entity that is allowed to transmit a duplicate, an order of RLC entities in which the second communication device should transmit a first data packet and following duplicates, and whether the duplication is activated or deactivated for a DRB; and decide whether to activate a first duplication process and/or a second duplication process, and/or deactivate the first duplication process and/or the second duplication process for one or more DRBs, wherein the first duplication process implies that the duplicates are transmitted over same RLC entities over time, and the second duplication process implies that the duplicates are transmitted on a need basis and/or are transmitted over RLC entities that can change over time.

9. The first communication device according to claim 8, wherein deciding whether to activate and/or deactivate the first duplication process and/or the second duplication process is taking a timer into account.

10. The first communication device according to claim 8, wherein the processing circuitry is further configured to: determine the maximum number of duplicates to be transmitted.

11. The first communication device according to claim 8, wherein the processing circuitry is further configured to: determine a number of RLC entities for transmitting one or more duplicates.

12. The first communication device according to claim 11, wherein the processing circuitry is further configured to: transmit the one or more duplicates using the determined number of RLC entities.

13. The first communication device according to claim 8, wherein the transmission is adapted to be handled over at least two RLC entities.

14. A second communication device for controlling transmission of one or more data packets in a wireless communication network, wherein the second communication device comprises a communication interface and processing circuitry associated with the communication interface, the processing circuitry is configured to:

receive an indication, from a first communication device, adapted to indicate one or more of the following: a maximum number of duplicates allowed to be transmitted for each data packet, a type of duplication, a data radio bearer, (DRB) for which duplication is configured, a radio link control (RLC) entity that is allowed to transmit a duplicate, an order of RLC entities in which the second communication device should transmit a first data packet and following duplicates, and whether the duplication is activated or deactivated for a DRB; and handle communication based on the received indication, the handling comprises receiving duplicates according to a first duplication process and/or a second duplication process, based on whether the first communication device decided to activate the first duplication process and/or the second duplication process, and/or deactivate the first duplication process and/or the second duplication process for one or more DRBs, wherein the first duplication process implies that the duplicates are transmitted over same RLC entities over time, and the second duplication process implies that the duplicates are transmitted on a need basis and/or are transmitted over RLC entities that can change over time.

* * * * *